(12) United States Patent
Biernath

(10) Patent No.: US 8,384,852 B2
(45) Date of Patent: Feb. 26, 2013

(54) HYBRID DAYLIGHT-COUPLED BACKLIGHTS FOR SUNLIGHT VIEWABLE DISPLAYS

(75) Inventor: Rolf W. Biernath, Wyoming, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 311 days.

(21) Appl. No.: 12/951,339

(22) Filed: Nov. 22, 2010

(65) Prior Publication Data
US 2012/0127401 A1 May 24, 2012

(51) Int. Cl.
*G02F 1/1335* (2006.01)
(52) U.S. Cl. ............... 349/68; 349/64; 349/67; 349/96
(58) Field of Classification Search ............ 349/68, 349/61, 62, 64, 65, 67, 96, 113, 114; 362/97.1, 362/97.2, 609, 612, 1, 19
See application file for complete search history.

(56) References Cited

U.S. PATENT DOCUMENTS

| | | | |
|---|---|---|---|
| 3,828,909 A | 8/1974 | Roamo et al. |
| 3,838,565 A | 10/1974 | Carlyle |
| 3,838,909 A | 10/1974 | Fitzgibbons |
| 3,966,303 A | 6/1976 | Yamamoto |
| 4,176,084 A | 11/1979 | Luckenbach |
| 4,289,383 A | 9/1981 | Schwarzschild |
| 4,298,249 A | 11/1981 | Gloor et al. |
| 4,635,128 A | 1/1987 | Toyoda |
| 5,099,343 A | 3/1992 | Margerum et al. |
| 5,211,463 A | 5/1993 | Kalmanash |
| 5,211,493 A | 5/1993 | Stephenson et al. |
| 5,303,322 A | 4/1994 | Winston et al. |
| 5,412,492 A | 5/1995 | Zammit et al. |
| 5,442,522 A | 8/1995 | Kalmanash |
| 5,479,275 A | 12/1995 | Abileah |
| 5,479,276 A | 12/1995 | Herbermann |
| 5,479,328 A | 12/1995 | Lee et al. |
| 5,510,915 A | 4/1996 | Ge et al. |
| 5,521,465 A | 5/1996 | Budzilek et al. |
| 5,536,558 A | 7/1996 | Shelton |
| 5,739,876 A | 4/1998 | Stewart |
| 5,760,760 A | 6/1998 | Helms |
| 5,777,704 A | 7/1998 | Selker |
| 5,786,801 A | 7/1998 | Ichise |
| 5,818,553 A | 10/1998 | Koench et al. |
| 5,986,728 A | 11/1999 | Bernard |
| 6,034,750 A | 3/2000 | Rai et al. |
| 6,173,517 B1 | 1/2001 | Eibner et al. |
| 6,184,946 B1 | 2/2001 | Ando et al. |
| 6,188,460 B1 | 2/2001 | Faris |
| 6,219,116 B1 | 4/2001 | Yuuki et al. |
| 6,273,577 B1 | 8/2001 | Goto et al. |

(Continued)

FOREIGN PATENT DOCUMENTS

| | | |
|---|---|---|
| CN | 101349833 | 1/2009 |
| DE | 3834492 | 10/1988 |

(Continued)

*Primary Examiner* — Thoi Duong

(57) ABSTRACT

An daylight-coupled display includes a plurality of passive backlights cascaded in a stack for backlighting of LCD panels or static display panels. The display includes a diffuser to transmit light to multiple cascaded curved reflectors, each of which reflects light for backlighting of the display. A polarization rotator is located within the backlight such that the reflectors provide the correct polarization of light to the LCD panel for backlighting of it. One daylight-coupled display can include an active light source to provide light to the reflectors A secondary light source can provide light to at least one of the reflectors to provide backlighting of the display in low lighting conditions.

20 Claims, 4 Drawing Sheets

U.S. PATENT DOCUMENTS

| | | |
|---|---|---|
| 6,285,426 B1 | 9/2001 | Akins et al. |
| 6,428,198 B1 | 8/2002 | Saccomanno et al. |
| 6,447,132 B1 | 9/2002 | Harter, Jr. |
| 6,592,232 B2 | 7/2003 | McGowan |
| 6,771,331 B1 | 8/2004 | Kubota et al. |
| 6,795,137 B1 | 9/2004 | Whitted et al. |
| 6,929,392 B2 | 8/2005 | Kim et al. |
| 6,961,108 B2 | 11/2005 | Wang et al. |
| 7,027,113 B2 | 4/2006 | Kim et al. |
| 7,121,710 B2 | 10/2006 | Kim et al. |
| 7,213,955 B1 | 5/2007 | Ladouceur et al. |
| 7,306,356 B1 | 12/2007 | Ahmadi |
| 7,427,140 B1 | 9/2008 | Ma |
| 7,430,349 B2 | 9/2008 | Jones |
| 7,510,288 B2 | 3/2009 | Shin et al. |
| 7,513,642 B2 | 4/2009 | Sormani |
| 7,522,775 B2 | 4/2009 | Boon |
| 2002/0114147 A1 | 8/2002 | Harter, Jr. |
| 2003/0095397 A1 | 5/2003 | McGowan |
| 2003/0193457 A1 | 10/2003 | Wang et al. |
| 2003/0201702 A1 | 10/2003 | Kim et al. |
| 2003/0204977 A1 | 11/2003 | Hong |
| 2004/0181989 A1 | 9/2004 | Miller |
| 2004/0223100 A1 | 11/2004 | Kotchick et al. |
| 2004/0252940 A1 | 12/2004 | Atac et al. |
| 2004/0263720 A1 | 12/2004 | Wang et al. |
| 2005/0018106 A1 | 1/2005 | Wang et al. |
| 2005/0146651 A1 | 7/2005 | Whitted et al. |
| 2006/0002140 A1 | 1/2006 | Kim et al. |
| 2007/0091635 A1 | 4/2007 | Ladouceur et al. |
| 2007/0171322 A1 | 7/2007 | Shin et al. |
| 2007/0195519 A1 | 8/2007 | Shin et al. |
| 2007/0200972 A1 | 8/2007 | Ladouceur et al. |
| 2007/0273680 A1 | 11/2007 | Yang et al. |
| 2008/0064096 A1 | 3/2008 | Renauld et al. |
| 2008/0064115 A1 | 3/2008 | Hiramatsu et al. |
| 2008/0064133 A1 | 3/2008 | Lee et al. |
| 2008/0117346 A1 | 5/2008 | Jepsen |
| 2008/0201999 A1 | 8/2008 | Chung et al. |
| 2008/0266850 A1 | 10/2008 | Masri |
| 2009/0027591 A1 | 1/2009 | Hwang et al. |
| 2009/0027921 A1 | 1/2009 | Chou et al. |
| 2009/0061945 A1 | 3/2009 | Ma |
| 2009/0213041 A1 | 8/2009 | Unger et al. |
| 2009/0268429 A1 | 10/2009 | Hashimoto et al. |
| 2010/0073791 A1 | 3/2010 | Mahowald |
| 2010/0141869 A1 | 6/2010 | Biernath et al. |
| 2010/0165001 A1 | 7/2010 | Savvateev et al. |
| 2010/0328578 A1 | 12/2010 | Biernath et al. |

FOREIGN PATENT DOCUMENTS

| | | |
|---|---|---|
| EP | 0 399 506 | 5/1990 |
| FR | 2866464 | 2/2004 |
| GB | 2 370 404 | 6/2002 |
| GB | 2 405 252 | 2/2005 |
| JP | 07-094008 | 4/1995 |
| JP | 07-248492 | 9/1995 |
| JP | 09-297305 | 11/1997 |
| JP | 10-48615 | 2/1998 |
| JP | 10-068948 | 3/1998 |
| JP | 10-123507 | 5/1998 |
| JP | 11-202784 | 7/1999 |
| JP | 2000-187450 | 7/2000 |
| JP | 2002-150822 | 5/2002 |
| JP | 2006/189609 | 7/2006 |
| KR | 2006-071000 | 6/2006 |
| KR | 2008-089709 | 4/2007 |
| KR | 2009-008928 | 1/2009 |
| TW | 2006/19758 | 6/2006 |

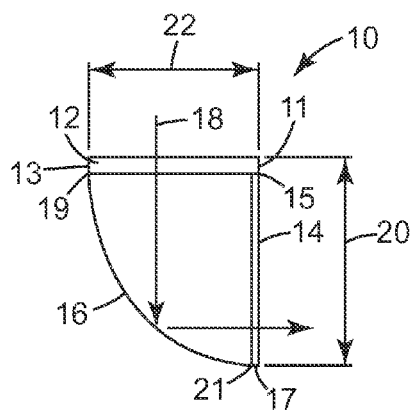
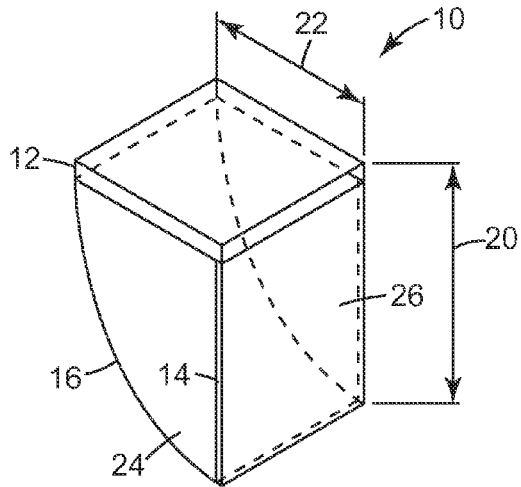
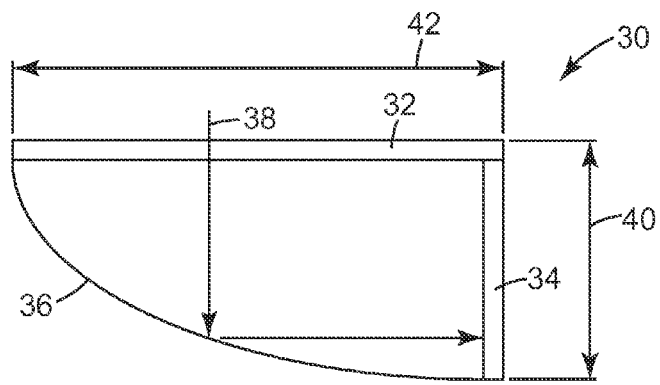
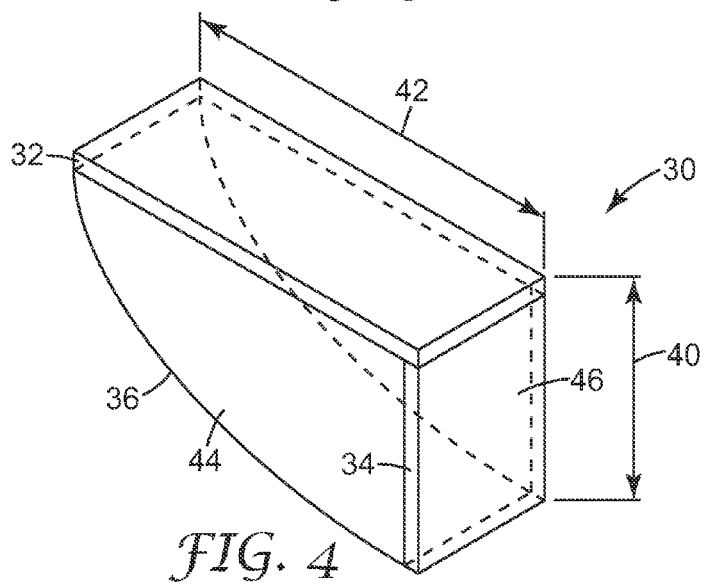

HYBRID DAYLIGHT-COUPLED BACKLIGHTS FOR SUNLIGHT VIEWABLE DISPLAYS

BACKGROUND

Sunlight viewability of digital displays, such as a liquid crystal display (LCD), is increasing in business importance as such displays become more ubiquitous. Advertisers desire the ability to use digital media in outdoor environments, and consumers would like their electronics to be usable everywhere. Current solutions to the outdoor sunlight visibility problem fall short because of insufficient display brightness or excessive power consumption and its resultant heat load. For example, one solution achieves 2000 nits brightness by using 720 three watt LEDs in a 40 inch display, which requires a liquid cooling system to dissipate the 2.1 kW of heat. Also, the display with backlight weighs 110 lbs., a significant amount of weight for such a display.

SUMMARY

An daylight-coupled display, consistent with the present invention, includes a plurality of passive backlights cascaded for backlighting of LCD panels or static display panels. The display includes a diffuser to transmit light to multiple cascaded curved reflectors, each of which reflects light for backlighting of the display. A polarization rotator is located within the backlight such that the reflectors provide the correct polarization of light to the LCD panel for backlighting of it.

One type of daylight-coupled display can include an active light source to provide light to the reflectors, and a secondary light source to provide light to at least one of the reflectors, to provide backlighting of the display in low lighting conditions.

BRIEF DESCRIPTION OF THE DRAWINGS

The accompanying drawings are incorporated in and constitute a part of this specification and, together with the description, explain the advantages and principles of the invention. In the drawings, FIG. 1 is a side view of a first daylight-coupled LCD device;

FIG. 2 is a perspective view of the daylight-coupled LCD device of FIG. 1;

FIG. 3 is a side view of a second daylight-coupled LCD device;

FIG. 4 is a perspective view of the daylight-coupled LCD device of FIG. 3;

DETAILED DESCRIPTION

Figure 5:
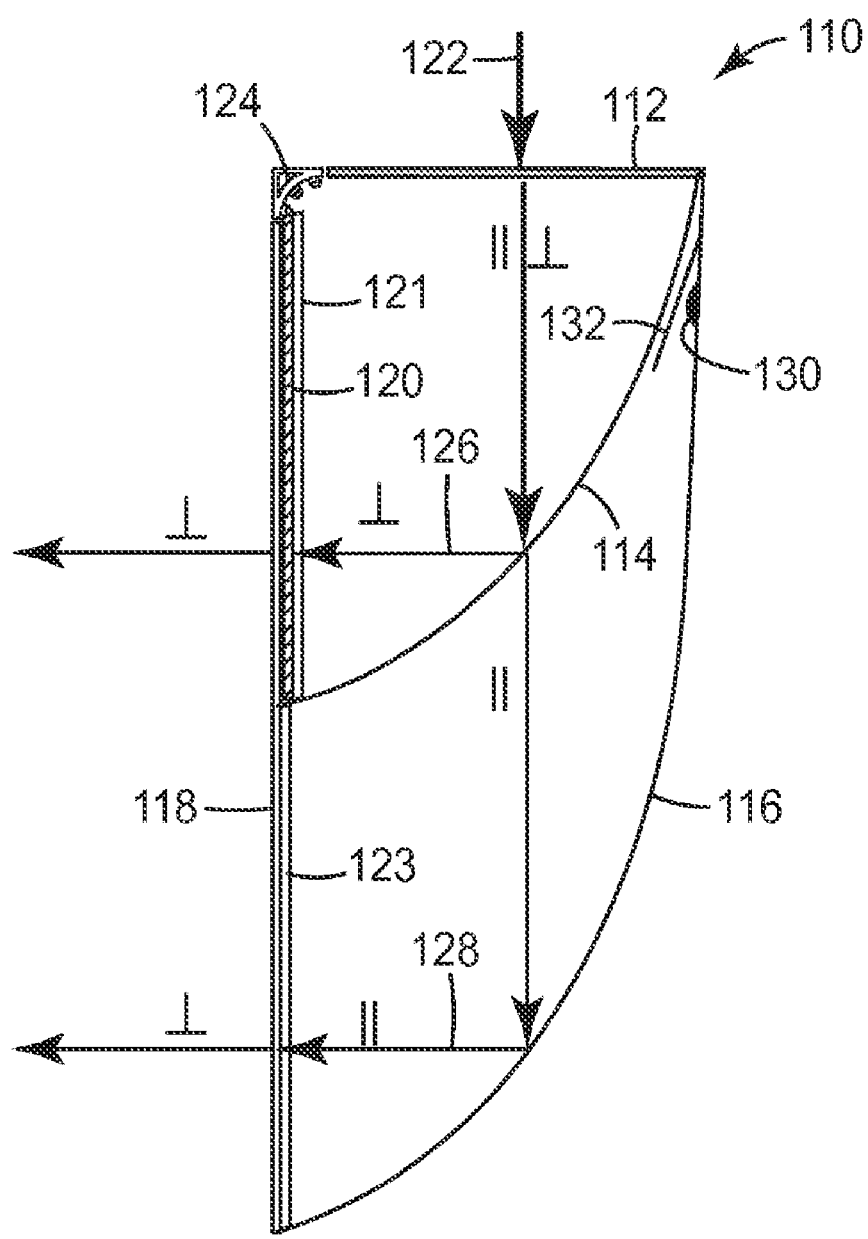
FIG. 5 is a side view of a first type of stacked daylight-coupled LCD device with a secondary light source.

Using sunlight as a source of illumination for a display helps to save electrical power, enabling a more energy-efficient display. The daylight-coupled backlight provides a daylight-viewable solution that is potentially solar powered and also produces a high brightness display. At night-time or other low ambient light conditions, the backlight can be supplemented with an active light source. By using the sun to light the backlight, it saves a substantial power load and enables an energy efficient display, daylight viewable, that is potentially completely solar powered and also produces a high brightness display.

Daylight-coupled LCD devices can be used in a variety of outdoor settings for digital signage, traffic signage, or to display of other types of information. The devices can be housed in a kiosk or other types of enclosures depending upon, for example, a desired use of the devices. The devices can be used on bus shelters, sides of buildings, trucks, trailers, or other outdoor locations for advertisement or other information presentation. They can also be used in a variety of indoor settings to display information or advertisement in store-front windows, high-ambient mall courtyards, or other locations. They can also be used inside of a car to display information on the center stack, driver cluster or dashboard. They can be mounted on the backside of the headrests or from the ceiling to display entertainment within a vehicle. The devices can also be in a smaller form factor as well—display diagonals less than 7 inches. The display panels in the devices can be arranged in a portrait mode or a landscape mode for display of information. They may also be set side by side to simulate a larger display or make for a group of displays.

The term LCD is used here to represent the variety of liquid crystal panels currently available on the market and those that may become available in the future, including, but not limited to conventional TN panels; PVA, MVA or OCB mode panels; and transflective panels. Additionally, the LCD panels may be substituted with other backlit light-valve type displays, other backlit electronic displays, electronic signage, or static signage. Also, the LCD panels may be substituted with solar panels to enhance the amount of daylight upon the solar panels or allow the solar panels to be configured in varying orientations, or the LCD panels may be substituted with other devices requiring illumination. The backlight can be designed to be collapsible so that it functions as a more conventional backlight in its collapsed state, but by means of hinges, springs, or slides, rearranges to form the backlight described in the present specification. Additionally, it may be designed to be collapsible for purposes of transportation or storage.

Preferably, highly reflective specular films are used throughout the cavity. However, optionally, diffusers may be added at various locations, such as behind the LCD panel, for example, to hide seams or interfaces between components. All diffusers in the system, including the entrance aperture, may be passive such as bead coated films and bulk diffuser plates, or they may be actively controlled such as PDLC (Polymer Dispersed Liquid Crystal) films or plates, for example. The diffusers may be uniform in characteristics or non-uniform, such as printed dot extractors, variable density films or plates, or other patterned systems.

Examples of various passive and hybrid backlights are disclosed in the following, all of which are incorporated herein by reference as if fully set forth: U.S. Patent Application Publication No. 2010/0141869; U.S. patent application Ser. No. 12/492,166 and filed Jun. 26, 2009; U.S. patent application Ser. No. 12/620,957 and filed Nov. 18, 2009; and U.S. patent application Ser. No. 12/702,608 and filed Feb. 9, 2010.

Passive Daylight-Coupled Display

FIG. 1 is a side view of a first daylight-coupled LCD device 10, and FIG. 2 is a perspective view of the daylight-coupled LCD device 10. Device 10 includes an LCD panel 14 having a top side 15 and a bottom side 17, a diffuser 12 having a front edge 11 and a back edge 13, a curved reflector 16 having a top side 19 and a bottom side 21, and side panels 24 and 26. Device 10 has a height 20 and depth 22.

As represented by arrow 18, diffuser 12 transmits at least some daylight to reflector 16 and possibly to other components. Reflector 16 then reflects the light upon LCD panel 14 in order to provide backlighting for the LCD panel. Device 10 is designed with a depth 22 and curvature of reflector 16 such that reflector 16 provides for substantially uniform distribution of the reflected daylight onto LCD panel 14. With a circular shape for reflector 16, meaning that it forms a portion of a circle, the ratio of the height 20 to depth 22 is approximately 1 to 1. In other embodiments, particular if a turning film is used behind the LCD panel, the ratio of the height of the LCD panel to the depth of the diffuser is approximately 1 to 0.5. A stacked reflector configuration can realize a preferred ratio of 1 to 0.375. In device 10, and in other daylight-coupled LCD devices, diffuser 12 is preferably positioned at an angle of approximately 90° with respect to LCD panel 14, although the angle can be greater than 120° and can also be less than 90°.

By using daylight for passive backlighting, the device can be used during the daytime in outdoor settings without the need for an active light source, thus saving power and reducing heat load on the device. To maintain brightness, an active light source can be used during cloudy conditions. If brightness under cloudy or dim ambient lighting is not a concern, then an active light source is not needed. In addition to using sunlight, the device 10 can use other external light sources for passive backlighting, such as streetlights, spotlights, projectors, or overhead fluorescent lights. All the external light sources can be combined and concentrated for the passive backlight using, for example, lenses, light pipes, mirrors, or ambient light concentrators.

FIG. 3 is a side view of a second daylight-coupled LCD device 30, and FIG. 4 is a perspective view of the daylight-coupled LCD device 30. Device 30 includes an LCD panel 34, a diffuser 32, a curved reflector 36, and side panels 44 and 46. Device 30 has a height 40 and depth 42.

As represented by arrow 38, diffuser 32 transmits at least some daylight to reflector 36 and possibly to other components. Reflector 36 then reflects the light upon LCD panel 34 in order to provide backlighting for the LCD panel. Device 30 is designed with a depth 42 and curvature of reflector 36 such that reflector 36 provides for substantially uniform distribution of the reflected daylight onto LCD panel 34. Having a deeper diffuser cavity, such as that shown in device 30 in comparison to device 10, can allow the diffuser to collect more light for the reflector and backlighting of the LCD panel, thereby enabling a wider viewing angle both horizontally and vertically. With a parabolic shape for reflector 36, meaning that it forms a portion of a parabola, the ratio of the height 40 to depth 42 can be approximately 1 to 3.

Although circular and parabolic shapes are shown for the reflectors, other shapes are possible, including a three-dimensional (3D) curvature or a straight reflector. Also, the shape of the reflector can be variable. For a shaped reflector, it is preferably shaped as a section of a parabola and is arranged with edges meeting the diffuser and LCD panel at an angle of approximately 20° to 40° to axes normal to the diffuser and LCD panel.

The diffusers in daylight-coupled LCD devices, such as diffusers 12 and 32, can be implemented with, for example, one or more of the following: beaded gain diffusers; microstructured gain diffusers; diffuser sheet materials such as bulk diffusers (particle filled, phase separated, or microcavitated); or diffuser plates. The diffuser can optionally be domed or faceted for concentrating the daylight or other light source. An optional top enclosure can be used between the diffuser and the top of the backlight such that the diffuser is raised above the top edge of the LCD panel, and with the optional top enclosure a tunnel can be used to concentrate light from the raised diffuser into the backlight cavity. Diffusers 12 and 32 preferably block ultraviolet (UV) light, and reflectors 16 and 36 preferably transmit infrared (IR) light to avoid heat loading on the LCD device. The diffusers can provide sufficient diffusion of light to achieve uniform backlighting, and the diffusers typically transmit as least 50% and more preferably at least 70% of the visible light incident upon them, while exhibiting low clarity as measured by the Haze-Gard product available from BYK-Gardner USA.

The reflectors in daylight-coupled LCD devices, such as reflectors 16 and 36, can be implemented with, for example, one or more of the following: an Enhanced Specular Reflector (ESR) film available from 3M Company; a reflective polarizer; a reflective polarizing film; MIRO or MIRO Silver available from Anomet, Inc., Ontario, Canada; or the silvered or aluminized Mylar product available from E.I. DuPont DeNemours and Company.

Reflective polarizers are films that reflect one polarization preferentially over the other polarization. Reflective polarizer types include multilayer-based, blend or dispersed phase based, fiber-based, cholesteric liquid crystal-based, wire grid, or Brewster-angle effect polarizers. Specifically, multilayer reflective polarizers can be implemented with the following: DBEF (brightness enhancement film), such as DBEF-Q, D-400, and D2-400, all from 3M Company; Advanced Polarizing Film (APF), such as LEF-D, also from 3M Company; and other multilayer variants. These multilayer reflective polarizers can also provide for haze by having a low haze surface or matte finish. The DBEF-D400 film has 60% haze in both polycarbonate layers, and the stack as a whole demonstrates a haze of 72%+/−10%. The LEF-D film has 12% haze in one of the polycarbonate layers and 20% in the other, and the overall haze of stack is 41%+/−10%. A specific example of blend or dispersed phase reflective polarizers include DRPF, also from 3M Company. Brewster Angle reflective polarizers can be built using the "pile of plates" phenomenon. A preferred reflective polarizer is APF, which includes both the specular APF and LEF-D, which is APF sandwiched in-between two hazy polycarbonate films.

Use of the ESR film, or other reflective films that transmit IR light, leads to a decrease in the temperature of the LCD panel since the panel does not end up receiving and absorbing that IR light. Reflectors 16 and 36 preferably transmit infrared (IR) light to avoid heat loading on the LCD device. The reflector can optionally be faceted or coated to provide for particular visual effects and can also optionally include a bead coated or microstructured coated ESR film or a low haze coating. The reflector films can be supported by, for example, polymethyl methacrylate (PMMA) or other plastic plate, ESR film on stainless steel, or aluminum if additional mechanical support is desired. If a metal support or other material that reflects IR is used to support the ESR film, then it is preferable to reject IR before it enters the backlight cavity, for example using an IR mirror film, such as the Prestige or Crystalline film products available from 3M Company, on or under the diffuser plate, to reject the incident IR light. The reflectors preferably have a smooth curved shape when in use, although a curved shape having non-smooth portions can also be used. The reflectors are preferably specular and better than 80% reflective in the visible, and more preferably 90% or higher, and most preferably 98% or higher reflectivity. An example of such a film is the ESR film.

The side panels in daylight-coupled LCD devices, such as panels 24, 26, 44, and 46, can be implemented with, for example, the following: ESR film; a Lambertian reflector; a reflective fabric; a diffuser plate; or a reflective film such as the Solar Mirror Film product from 3M Company. The panels can be implemented with separate components. Alternatively, the side panels and reflector can be formed together as a 3D cavity such as with a thermoformed reflector cavity.

The diffuser, reflector, and side panels in daylight-coupled LCD devices can be held together with a frame, for example. The components of the daylight-coupled LCD device can be adjacent one another by being in direct contact, by being connected through one or more other components such as a frame, or by being held next to one another or attached to one another. Adjacent components can optionally include an air gap between them.

Devices 10 and 30, and other daylight-coupled LCD devices, can include additional films on the front of the LCD panel. Examples of those additional films include the following: a shatter protection film such as the anti-splinter film product available from 3M Company; an anti-reflective coating or film; an anti-glare film; an IR filter film such as the Prestige or Crystalline film products available from 3M Company; and as a single film with multiple functionalities. Likewise, additional films may be used directly on or under the diffuser plate to provide UV protection, IR protection, shatter protection, and color correction. Additional films could also be included on the back of the LCD panel, either near, adjacent, or in contact with it. Examples of these films include the following: reflective polarizer film such as the DBEF product available from 3M Company; DBEF with a diffuse adhesive; and microreplicated films such as prismatic films or engineered diffusers, or combinations thereof.

Daylight-Coupled Displays with Secondary Light Source

FIG. 5 is a side view of a first daylight-coupled LCD device 110 with a secondary light source. Device 110 includes an LCD panel 118, a diffuser 112, and curved reflectors 114 and 116. The curved reflectors 114 and 116 are each preferably implemented with a reflective polarizer. As represented by arrow 122, diffuser 112 transmits daylight to reflectors 114 and 116. Reflector 114 reflects light of a first polarization 126 to LCD panel 118 to provide backlighting for an upper portion of LCD panel 118. Reflector 116 reflects light of a second polarization 128 to LCD panel 118 to provide backlighting for a lower portion of LCD panel 118. Reflector 114 is preferably positioned such that one end of it is located adjacent approximately a mid-point of LCD panel 118. The reflectors collectively transmit light to provide for substantially uniform distribution of the reflected daylight onto LCD panel 118. Device 110 also includes a polarization rotator 120 with corresponding reflective polarizer 121 positioned adjacent and behind the upper portion of LCD panel 118 to provide the correct polarization of light for backlighting the upper portion, and device 110 includes an optional reflective polarizer 123 positioned adjacent and behind the lower portion of LCD panel 118 and aligned with the pass axis of LCD panel 118. Device 110 also includes an active light source 124, such as LEDs, for backlighting the LCD panels in low ambient conditions. Furthermore, device 110 includes a secondary light source 130, such as LEDs, located on or adjacent reflector 116 and adjacent a reflector 132 for providing supplemental backlighting of LCD panel 118 in low ambient light conditions. Reflector 132 is preferably implemented with ESR film to reflect light from secondary source 130 to reflector 116.

Device 110 can alternatively be used as a daylighting device without the light source 124, secondary light source 130, and reflector 132. In that alternative use, reflectors 114 and 116 can each be implemented with a reflective polarizer, or optionally reflector 114 is implemented with a reflective polarizer and reflector 116 is implemented with ESR film.

Figure 6:
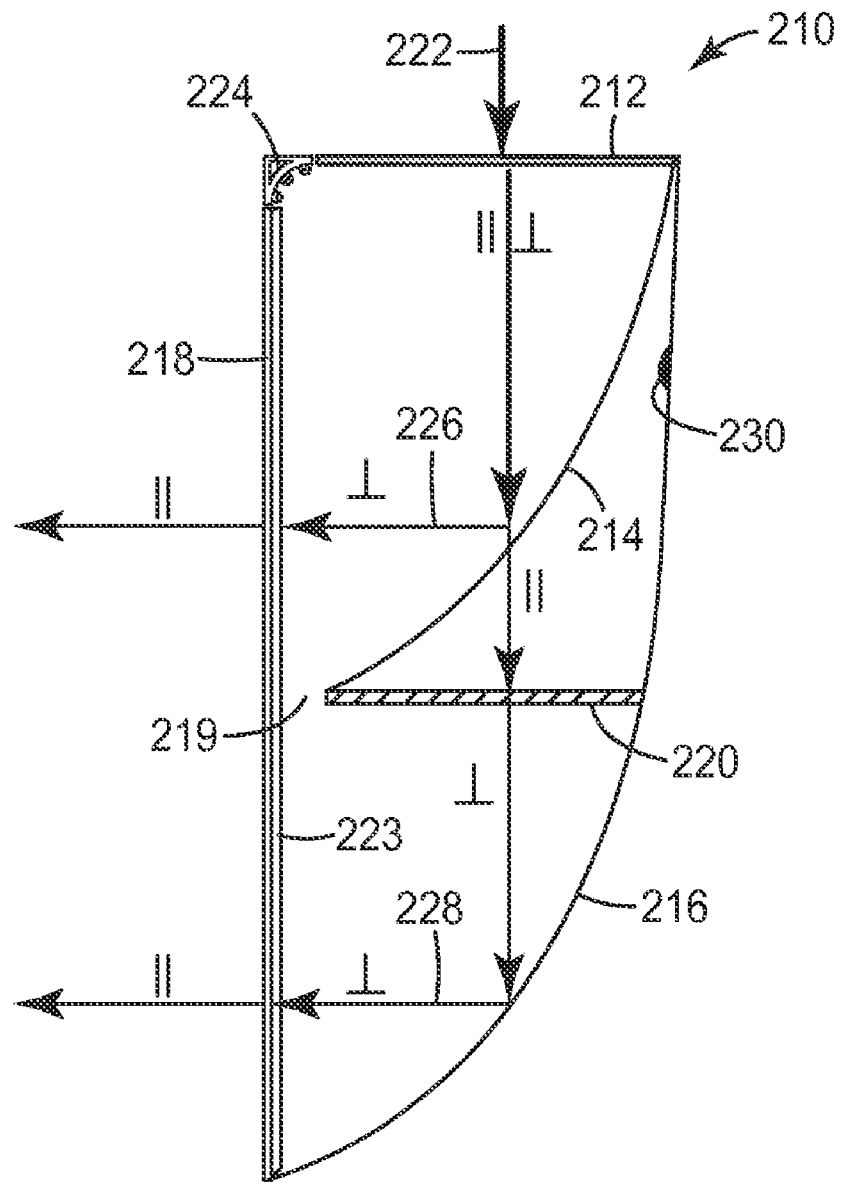
FIG. 6 is a side view of a second type of stacked daylight-coupled LCD device with a secondary light source.

FIG. 6 is a side view of a second daylight-coupled LCD device 210 with a secondary light source. Device 210 includes an LCD panel 218, a diffuser 212, and curved reflectors 214 and 216. The curved reflectors 214 and 216 are each preferably implemented with a reflective polarizer. As represented by arrow 222, diffuser 212 transmits daylight to reflectors 214 and 216. Reflector 214 reflects light of a first polarization 226 to LCD panel 218 to provide backlighting for an upper portion of LCD panel 218. Reflector 216 reflects light 228 of the first polarization to LCD panel 218 to provide backlighting for a lower portion of LCD panel 218. Reflector 214 is preferably positioned such that one end of it is located adjacent approximately a mid-point of LCD panel 218. Reflector 214 is also preferably positioned with a slight gap 219 between an edge of reflector 214 and the back of LCD panel 218 to provide for "seam hiding" such that the edge of reflector 214 is not visible or has little visibility on the front of LCD panel 218. Gap 219 can also provide for additional air flow behind LCD panel 218, which can help with cooling of it.

A polarization rotator 220 located between reflectors 214 and 216 provides the correct polarization of light to reflector 216 for backlighting the lower portion of LCD panel 218. Polarization rotator 220 is positioned substantially perpendicular to LCD panel 218, meaning polarization rotator 220 is perpendicular to LCD panel 218 or close enough to being perpendicular to still provide for the correct polarization of light for backlighting of the lower portion of LCD panel 218. One end of polarization rotator 220 can be attached to an end of reflector 214 adjacent gap 219, as shown, or located proximate the end of reflector 214.

The reflectors collectively transmit light to provide for substantially uniform distribution of the reflected daylight onto LCD panel 218. Device 210 includes an optional reflective polarizer 223 positioned adjacent and behind LCD panel 118 and aligned with the pass axis of LCD panel 118. Device 210 also includes an active light source 224, such as LEDs, for backlighting the LCD panels in low ambient conditions. Furthermore, device 210 includes a secondary light source 230, such as LEDs, located on or adjacent reflector 216 for providing supplemental backlighting of LCD panel 218 in low ambient light conditions.

Device 210 can alternatively be used as a daylighting device without the light source 224 and secondary light source 230. In that alternative use, reflectors 214 and 216 can each be implemented with a reflective polarizer, or optionally reflector 214 is implemented with a reflective polarizer and reflector 216 is implemented with ESR film.

Figure 7:
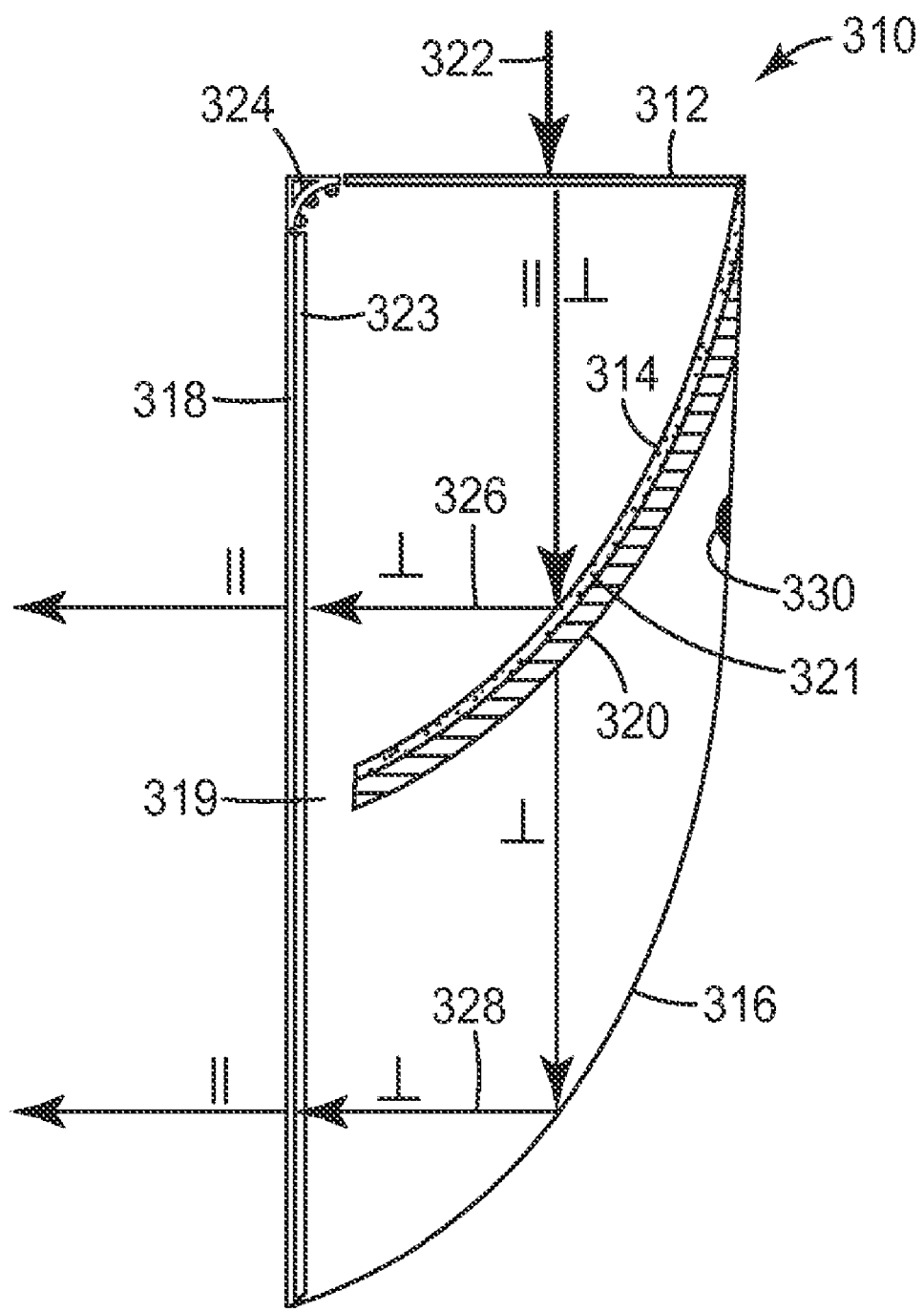
FIG. 7 is a side view of a third type of stacked daylight-coupled LCD device with a secondary light source.

FIG. 7 is a side view of a third daylight-coupled LCD device 310 with a secondary light source. Device 310 includes an LCD panel 318, a diffuser 312, and curved reflectors 314 and 316. The curved reflectors 314 and 316 are each preferably implemented with a reflective polarizer. As represented by arrow 322, diffuser 312 transmits daylight to reflectors 314 and 316. Reflector 314 reflects light of a first polarization 326 to LCD panel 318 to provide backlighting for an upper portion of LCD panel 318. Reflector 316 reflects light 328 of the first polarization to LCD panel 318 to provide backlighting for a lower portion of LCD panel 318. Reflector 314 is preferably positioned such that one end of it is located adjacent approximately a mid-point of LCD panel 318. Reflector 314 is also preferably positioned with a slight gap 319 between an edge of reflector 314 and the back of LCD panel 318 to provide for "seam hiding" such that the edge of reflector 314 is not visible or has little visibility on the front of LCD panel 318. Gap 319 can also provide for additional air flow behind LCD panel 318, which can help with cooling of it.

A polarization rotator 320 is located underneath and conforming to the shape of reflector 314 to provide the correct polarization of light to reflector 316 for backlighting the lower portion of LCD panel 318. As shown, polarization rotator 320 can be adhered to the underside of reflector 314 with an adhesive 321. Polarization rotator 320 can also have one end positioned adjacent an end of reflector 314 at gap 319. Adhesive 321 can preferably be implemented with the 8172 adhesive product from 3M Company, although other adhesives can alternatively be used.

The reflectors collectively transmit light to provide for substantially uniform distribution of the reflected daylight onto LCD panel 318. Device 310 includes an optional reflective polarizer 323 positioned adjacent and behind LCD panel 318 and aligned with the pass axis of LCD panel 318. Device 310 also includes an active light source 324, such as LEDs, for backlighting the LCD panels in low ambient conditions. Furthermore, device 310 includes a secondary light source 330, such as LEDs, located on or adjacent reflector 316 for providing supplemental backlighting of LCD panel 318 in low ambient light conditions.

Device 310 can alternatively be used as a daylighting device without the light source 324 and secondary light source 330. In that alternative use, reflectors 314 and 316 can each be implemented with a reflective polarizer, or optionally reflector 314 is implemented with a reflective polarizer and reflector 316 is implemented with ESR film.

Devices 110, 210, and 310 can be implemented with the exemplary components, configurations, and optional features described with respect to FIGS. 1-4 and in the references identified above. In devices 210 and 310, the gaps 219 and 319 can preferably have a width between 0.5 inches and 1 inch for a 46 inch diagonal LCD panel. Furthermore, the lower reflectors 216 and 316 can optionally have gap between their bottom edges and the back of the LCD panels. Also, devices 210 and 310 can include an optional reflector adjacent the secondary light sources 230 and 330, similar to reflector 132 in device 110.

Example for Brightness Uniformity

The following illustrates the meaning of substantially uniform distribution of daylight with passive backlights to provide for useable daylight-coupled displays.

A stacked daylight-coupled LCD display was constructed similar to FIG. 5. DBEF D-400 was used as the curved back reflector. An experimental silvered acrylic film (3M Company) was used for the sidewall reflectors. APF was used as reflective polarizer 121. A conventional polycarbonate retarder film with nominal retardance of 280 nanometers was used as polarization rotator 120. A 75% transmissive diffuser plate (CLAREX DR-III C LIGHT DIFFUSION FILTER, grade DR-75C, Astra Products, Baldwin, N.Y.) was used as the entrance diffuser 112. Uniformity was measured according to the VESA 2.0 Nine-point test method using a custom-built sunlight simulator. Uniformity was measured as (minimum brightness)/(maximum brightness) and is expressed as a percentage. Uniformity of the top half (zone) of the display was 47%, uniformity of the bottom half (zone) of the display was 75%, and nine-point uniformity of the full portrait-mode display was 69%, all of which appeared to be of sufficient uniformity for use outdoors, for example in outdoor quick service restaurant applications, according to a number of observers. The ratio of the top half brightness to the bottom half brightness was 1.03, which was also considered good.

Zonal uniformities of 30% or better are preferable, 50% or better is more preferred, and 75% or better is most preferred. Ratios of top brightness to bottom brightness in the range of 0.6 to 1.5 are preferable, 0.8 to 1.3 are more preferred, and 0.9 to 1.1 are most preferred.

The invention claimed is:

1. A passive daylight-coupled display, comprising:
   an LCD panel having a top side and a bottom side;
   a diffuser having a front edge adjacent the top side of the LCD panel and having a back edge;
   a first reflector having a top side adjacent the back edge of the diffuser and having a bottom side adjacent approximately a mid-point of the LCD panel;
   a second reflector having a top side adjacent the back edge of the diffuser and having a bottom side adjacent the bottom side of the LCD panel; and
   a polarization rotator located between the first and second reflectors and substantially perpendicular to the LCD panel,
   wherein the diffuser transmits daylight to the first and second reflectors, the first reflector reflects the daylight to a top portion of the LCD panel and provides for substantially uniform distribution of the daylight on the top portion of the LCD panel, and the second reflector reflects the daylight to a bottom portion of the LCD panel and provides for substantially uniform distribution of the daylight on the bottom portion of the LCD panel.

2. The display of claim 1, further comprising a reflective polarizer located behind the LCD panel.

3. The display of claim 1, further comprising an active light source positioned adjacent the front end of the diffuser, wherein the active light source provides for active backlighting of the LCD panel.

4. The display of claim 3, wherein the active light source comprises one or more light emitting diodes.

5. The display of claim 3, further comprising a secondary light source located on or adjacent the second reflector.

6. The display of claim 5, wherein the secondary light source comprises one or more light emitting diodes.

7. The display of claim 1, wherein at least one of the first and second reflectors comprises a reflective polarizing film.

8. The display of claim 1, wherein a ratio of a height of the LCD panel to a depth of an active portion of the diffuser is approximately 1 to 0.5.

9. The display of claim 1, further comprising a gap between the bottom side of the first reflector and the LCD panel.

10. The display of claim 1, wherein one end of the polarization rotator is attached to the bottom side of the first reflector.

11. A passive daylight-coupled display, comprising:
    an LCD panel having a top side and a bottom side;
    a diffuser having a front edge adjacent the top side of the LCD panel and having a back edge;
    a first reflector having a top side adjacent the back edge of the diffuser and having a bottom side adjacent approximately a mid-point of the LCD panel;
    a second reflector having a top side adjacent the back edge of the diffuser and having a bottom side adjacent the bottom side of the LCD panel; and
    a polarization rotator located underneath and conforming to a shape of the first reflector,
    wherein the diffuser transmits daylight to the first and second reflectors, the first reflector reflects the daylight to a top portion of the LCD panel and provides for substantially uniform distribution of the daylight on the top portion of the LCD panel, and the second reflector reflects the daylight to a bottom portion of the LCD panel and provides for substantially uniform distribution of the daylight on the bottom portion of the LCD panel.

12. The display of claim 11, further comprising a reflective polarizer located behind the LCD panel.

13. The display of claim 11, further comprising an active light source positioned adjacent the front end of the diffuser, wherein the active light source provides for active backlighting of the LCD panel.

14. The display of claim 13, wherein the active light source comprises one or more light emitting diodes.

15. The display of claim 13, further comprising a secondary light source located on or adjacent the second reflector.

16. The display of claim 15, wherein the secondary light source comprises one or more light emitting diodes.

17. The display of claim 11, wherein at least one of the first and second reflectors comprises a reflective polarizing film.

18. The display of claim 11, wherein a ratio of a height of the LCD panel to a depth of an active portion of the diffuser is approximately 1 to 0.5.

19. The display of claim 11, further comprising a gap between the bottom side of the first reflector and the LCD panel.

20. The display of claim 11, wherein the polarization rotator is adhered to the first reflector with an adhesive.

* * * * *